(12) United States Patent
Harding et al.

(10) Patent No.: US 7,435,357 B2
(45) Date of Patent: Oct. 14, 2008

(54) POLYMERISED LIQUID CRYSTAL FILM WITH RETARDATION OR ORIENTATION PATTERN

(75) Inventors: Richard Harding, Hants (GB); Shirley Ann Marden, Parkstone (GB); Ian Victor Edward Hassall, Christchurch (GB); Janice McCreary, Southampton (GB); Karl Skjonnemand, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 400 days.

(21) Appl. No.: 10/552,710

(22) PCT Filed: Apr. 2, 2004

(86) PCT No.: PCT/EP2004/003547

§ 371 (c)(1),
(2), (4) Date: Oct. 7, 2005

(87) PCT Pub. No.: WO2004/090025

PCT Pub. Date: Oct. 21, 2004

(65) Prior Publication Data

US 2006/0193998 A1    Aug. 31, 2006

(30) Foreign Application Priority Data

Apr. 8, 2003   (EP) .................................. 03007917

(51) Int. Cl.
*C09K 19/00*    (2006.01)
*C09K 19/52*    (2006.01)

(52) U.S. Cl. ............... 252/299.1; 252/299.2; 252/299.3; 252/299.4; 252/299.5; 252/299.6; 252/299.7; 430/20; 430/270.1; 428/1.1; 428/1.2; 349/176

(58) Field of Classification Search ... 252/299.1–299.7; 430/20, 270.1; 428/1.1, 1.2; 349/176
See application file for complete search history.

(56) References Cited

U.S. PATENT DOCUMENTS

| | | | |
|---|---|---|---|
| 5,528,400 A | | 6/1996 | Arakawa |
| 5,770,107 A | | 6/1998 | Hassall et al. |
| 5,880,798 A | | 3/1999 | Walton et al. |
| 6,001,277 A | * | 12/1999 | Ichimura et al. ......... 252/299.4 |
| 6,291,035 B1 | | 9/2001 | Verrall et al. |
| 6,544,605 B1 | | 4/2003 | Verrall et al. |
| 7,122,227 B2 | * | 10/2006 | Vaughn-Spickers et al. .. 428/1.1 |
| 2006/0127605 A1 | * | 6/2006 | Takeda et al. ................. 428/1.3 |

FOREIGN PATENT DOCUMENTS

| | | |
|---|---|---|
| EP | 0 699 938 A | 3/1996 |
| EP | 0 816 905 A | 1/1998 |
| WO | WO 98/04651 A | 2/1998 |
| WO | WO 98/12584 A | 3/1998 |
| WO | WO 01/20394 A | 3/2001 |

* cited by examiner

*Primary Examiner*—Geraldina Visconti
(74) *Attorney, Agent, or Firm*—Millen, White, Zelano, Branigan, P.C.

(57) ABSTRACT

The invention relates to a polymerised liquid crystal (LC) film comprising at least one photoisomerisable compound and having a pattern of regions with different retardation and/or different orientation of the LC material, to methods of preparing such a film, and to its use as alignment layer, optical retardation film or optical waveguide in liquid crystal displays or other optical or electrooptical components or devices, or for decorative or security applications.

38 Claims, 2 Drawing Sheets

POLYMERISED LIQUID CRYSTAL FILM WITH RETARDATION OR ORIENTATION PATTERN

FIELD OF THE INVENTION

The invention relates to a polymerised liquid crystal (LC) film comprising at least one photoisomerisable compound and having a pattern of regions with different retardation and/or different orientation of the LC material; The invention further relates to methods of preparing such a film, and to its use as alignment layer, optical retardation film or optical waveguide in LC displays or other optical or electrooptical components or devices, or for decorative or security applications.

BACKGROUND AND PRIOR ART

Liquid crystal displays (LCDs) known from prior art usually contain an assortment of different functional layers, like for example alignment layers, colour filters and retardation layers. Retardation films are used for example to convert between linear and circular polarised light and to compensate the deteriorating contrast and colour of the LCD at wide viewing angles. However, the optical dispersion of conventional retardation films as used in prior art often results in non-perfect conversion, i.e. not all frequencies of visible light are converted between linear and circular polarised states. This is especially disadvantageous for colour LCDs of the active matrix type, where a colour filter is applied so that different pixels of the display in the adressed state show different primary colours (R, G, B).

One aim of the present invention is to provide a retardation film for use in LCDs, especially in active matrix colour LCDs, which does not have the drawbacks of prior art films mentioned above, and in particular allows more efficient conversion between linear and circular polarised states for light of different wavelengths. Another aim is to provide advantageous methods and materials for the preparation of such a retardation film. Another aim is to provide advantageous uses of such a retardation film. Other aims of the present invention are immediately evident to the person skilled in the art from the following detailed description.

The inventors have found that these aims can be achieved by providing a patterned or pixelated retardation layer prepared by the methods as described below, which comprises a pattern of different regions or pixels with different retardation. The pixelated retardation layer can be applied to an LCD comprising a colour filter such that each pixel of the retardation layer has the correct retardation for the light passing through the corresponding pixel of the colour filter. In this way the polarised light passing through the display can be more efficiently converted. The pixelated retarder according to the present invention is preferably prepared by exposing a polymerizable liquid crystal (LC) material incorporating compounds with photosensitive groups to UV light.

It was also found that the methods and materials according to the present invention allow the preparation of retardation layers with different orientation of the LC material, for example planar and splayed layers. Thereby patterned films with a pattern of regions with different orientation and/or different retardation can be prepared. It is also possible to prepare a polymerised LC layer that acts as alignment layers for a subsequent layer, and stacks of films or layers having different orientation and/or retardation.

EP 02019792.7 discloses an optical retardation film with a retardation pattern comprising polymerised nematic LC material, and methods for its preparation by varying the polymerisation conditions and/or the composition of the polymerisable LC material. However, it does not disclose the films or methods according to the present invention.

SUMMARY OF THE INVENTION

The invention relates to a film comprising a polymerised liquid crystal (LC) material comprising at least one photoisomerisable compound, characterized in that said film comprises at least two regions with different retardation and/or at least two regions with different orientation of the LC material.

The invention further relates to a patterned film comprising polymerised liquid crystal (LC) material, characterized in that it comprises at least two regions with different retardation and at least two regions with different orientation of the LC material.

The invention further relates to a patterned film comprising polymerised liquid crystal (LC) material, characterized in that it comprises at least two regions with different retardation of the LC material.

The invention further relates to a method of preparing a film as described above, comprising the following steps:

a) providing a layer of a polymerisable LC material comprising at least one photoisomerisable compound onto a substrate,
b) aligning the layer of LC material into planar orientation,
c) exposing the LC material in the layer, or in selected regions thereof, to photoradiation that causes isomerisation of the isomerisable compound, preferably UV radiation,
d) polymerising the LC material in at least a part of the exposed regions of the material, thereby fixing the orientation, and
e) optionally removing the polymerised film from the substrate, preferably a process comprising steps a)-e) wherein the retardation and/or orientation of the LC material is controlled by varying the amount and/or type of the photoisomerisable compound, and/or by varying the intensity of the photoradiation and/or the exposure time.

The invention further relates to a method of preparing a multilayer comprising at least two layers of polymerised LC material having different orientation, comprising the following steps:

A) providing a first layer of a polymerisable LC material comprising at least one photoisomerisable compound onto a substrate,
B) aligning the first layer of LC material into planar orientation and polymerising the material, thereby fixing the orientation,
C) providing a second layer of LC material as described in steps A) and B), wherein the first layer serves as substrate, wherein the LC material in at least one of said first and second layers, or in selected regions thereof, before polymerisation is exposed to photoradiation that causes isomerisation of the isomerisable compound, preferably UV radiation.

The invention further relates to a method of preparing a film or a multilayer as described above, wherein the LC material is exposed to radiation that causes photoisomerisation and photopolymerisation, and wherein the steps of photoisomerisation and photopolymerisation are carried out under different conditions, in particular under different gas atmospheres, especially preferably wherein photoisomerisation is carried out in the presence of oxygen and photopolymerisation is carried out in the absence of oxygen.

The invention further relates to a film or a multilayer obtained by above methods.

The invention relates to a polymerisable LC material comprising at least one photoisomerisable compound as described above and below.

The invention further relates to the use of a film or multilayer as described above and below in liquid crystal displays (LCDs) or other optical or electrooptical components or devices, for decorative or security applications.

The invention further relates to the use of a film as described above and below as alignment layer, optical retardation film or optical waveguide.

The invention further relates to a patterned film comprising at least two regions having different retardation for use as optical retardation film in an active matrix colour LCD.

The invention further relates to an LCD comprising an optical retardation film as described above and below.

The invention further relates to the use of a film as described above and below, in particular a film having at least two regions or a pattern of regions with different retardation, as optical retardation film in an LCD, characterized in that the film is positioned between the substrates of the switchable LC cell.

The invention further relates to an LCD as described above and below, comprising a LC cell formed by two plane parallel substrates at least one of which is transparent to incident light, an electrode layer provided on the inside of at least one of said two transparent substrates and optionally superposed with an alignment layer, and an LC medium located between the two substrates that is switchable between at least two different states by application of an electric field, characterized in that the LCD comprises at least one film comprising polymerised LC material as described above and below that is positioned between the two plane parallel substrates forming the LC cell.

Definition of Terms

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' should denote materials or compounds comprising one or more rod-shaped, board-shaped or disk-shaped mesogenic groups, i.e. groups with the ability to induce liquid crystal phase behaviour. Liquid crystal (LC) compounds with rod-shaped or board-shaped groups are also known in the art as 'calamitic' liquid crystals. Liquid crystal compounds with a disk-shaped group are also known in the art as 'discotic' liquid crystals. The compounds or materials comprising mesogenic groups do not necessarily have to exhibit a liquid crystal phase themselves. It is also possible that they show liquid crystal phase behaviour only in mixtures with other compounds, or when the mesogenic compounds or materials, or the mixtures thereof, are polymerised.

For the sake of simplicity, the term 'liquid crystal material' is used hereinafter for both liquid crystal materials and mesogenic materials.

Polymerisable compounds with one polymerisable group are also referred to as 'monoreactive' compounds, compounds with two polymerisable groups as 'direactive' compounds, and compounds with more than two polymerisable groups as 'Multireactive' compounds. Compounds without a polymerisable group are also referred to as 'non-reactive' compounds.

The term 'reactive mesogen' (RM) means a polymerisable mesogenic or liquid crystal compound.

The term 'director' is known in prior art and means the preferred orientation direction of the long molecular axes (in case of calamitic compounds) or short molecular axis (in case of discotic compounds) of the mesogens in a liquid crystal material.

The term 'planar structure' or 'planar orientation' refers to a film wherein the optical axis is substantially parallel to the film plane.

The term 'homeotropic structure' or 'homeotropic orientation' refers to a film wherein the optical axis is substantially perpendicular to the film plane, i.e. substantially parallel to the film normal.

The terms 'tilted structure' or 'tilted orientation' refers to a film wherein the optical axis is tilted at an angle θ between 0 and 90 degrees relative to the film plane.

The term 'splayed structure' or 'splayed orientation' means a tilted orientation as defined above, wherein the tilt angle additionally varies monotonuously in the range from 0 to 90°, preferably from a minimum to a maximum value, in a direction perpendicular to the film plane.

The tilt angle of a splayed film hereinafter is given as the average tilt angle $\theta_{ave}$, unless stated otherwise.

The average tilt angle $\theta_{ave}$ is defined as follows $$\theta_{ave} = \frac{\sum_{d'=0}^{d} \theta'(d')}{d}$$

wherein θ' (d') is the local tilt angle at the-thickness d' within the film, and d is the total thickness of the film.

In planar, homeotropic and tilted optical films comprising uniaxially positive birefringent liquid crystal material with uniform orientation, the optical axis of the film is given by the director of the liquid crystal material.

The term 'orientation' as used in connection with optical films, for example in the terms 'splayed or tilted orientation' or 'homeotropic orientation' or 'planar orientation', is intended to describe the general spatial orientation direction of the optical axis of the films. This should not be confused with a patterned film having planar alignment, wherein the optical axis or the liquid crystal molecules are all oriented in planes parallel to the film plane, but within said plane have different azimuthal 'orientation' directions in different regions.

BRIEF DESCRIPTION OF THE DRAWINGS

FIG. 5 schematically depicts a transfective colour LCD comprising an optical film according to the present invention.

DETAILED DESCRIPTION OF THE INVENTION

One aspect of the invention relates to a patterned film comprising polymerised liquid crystal (LC) material, characterized in that it comprises at least two regions with different retardation and at least two regions with different orientation of the LC material, wherein said regions differing in retardation can also differ in orientation, or they can be different regions. Thus, for example one embodiment relates to a film with a pattern of a first and a second region, wherein the first and said second region differ in both retardation and orientation. Another embodiment relates for example to a film with a pattern of a first, a second and a third region, wherein said first and second region differ in one of retardation and orientation, and said third region differs in at least one of retardation and orientation from at least one of said first and said second region. Another embodiment relates for example to a film with a pattern of a first, a second, a third and a fourth region, each of which has a retardation different from each other region, and two of said regions have the same orientation. Other combinations are also possible.

The patterned film according to the present invention is preferably obtained by polymerisation or crosslinking of a polymerisable LC material, preferably by a process comprising steps a) to e) as described above. Apart from the specific conditions and materials described in this invention, the steps a) to e) can be carried out according to standard procedures that are known to the expert and are described in the literature.

The polymerisable LC material comprises a photoisomerisable compound, preferably a photoisomerisable mesogenic or LC compound, very preferably a photoisomerisable compound that is also polymerisable. The isomerisable compound changes its shape, e.g. by E-Z-isomerisation, when exposed to radiation of a specific wavelength, e.g. UV-radiation. This leads to disruption of the uniform planar orientation of the LC material, resulting in a drop of its birefringence. Since the optical retardation of an oriented LC layer is given as the product d·Δn of the layer thickness d and the birefringence Δn of the LC material, the drop in birefringence also causes a decrease of the retardation in the irradiated parts of the LC material. The orientation and retardation of the LC material is then fixed by in-situ polymerisation of the irradiated regions or of the entire film.

Polymerisation of the LC material is achieved for example by thermal or photopolymerisation. In case photopolymerisation is used, the type of radiation used for photoisomerisation and for photopolymerisation of the LC material may be the same or different. In case radiation, e.g. UV-radiation, of a wavelength is used that can cause both photoisomerisation and photopolymerisation of the LC material, the steps of photoisomerisation and photopolymerisation are preferably carried out under different conditions, in particular under different gas atmospheres. In this case preferably photoisomerisation is carried out in the presence of oxygen, like e.g. in air, and photopolymerisation is carried out in the absence of oxygen, especially preferably under an inert gas atmosphere of e.g. nitrogen or a noble gas like argon. If the isomerisation step is performed in the presence of oxygen or in air, the oxygen scavenges the free radicals produced from the photoinitiator present in the material and thus prevents polymerisation. In the next step oxygen or air is removed and replaced by an inert gas such as nitrogen or argon, thereby allowing polymerisation to occur. This allows better control of the process steps.

The degree of isomerisation and thus the birefringence change in the layer of LC material can be controlled e.g. by varying the radiation dose, i.e. the intensity, exposure time and/or power of the radiation. Also, by applying a photomask between the radiation source and the LC layer it is possible to prepare a film with a pattern of regions or pixels having specific values of the retardation that differ from each other. For example, a film comprised of two different values of retardation can be created using a simple, monochrome mask. A more complicated film exhibiting multiple regions of different retardation can be created using a grey-scale mask. After the desired retardation values are achieved the LC layer is polymerised. In this way it is possible to create a polymer retardation film with values of retardation ranging from that of the initial LC layer to zero. The value of retardation for the initial layer of LC material is controlled by appropriate selection of the layer thickness and the type and amounts of the individual components of the LC material.

The polymerisable LC material is preferably a nematic or smectic LC material, in particular a nematic material, and preferably comprises at least one di- or multireactive achiral RM and optionally one or more than one monoreactive achiral RMs. By using di- or multireactive RMs a crosslinked film is obtained wherein the structure is permanently fixed, and which exhibits high mechanical stability and high stability of the optical properties against external influences like temperature or solvents. Films comprising crosslinked LC material are thus especially preferred.

Polymerizable mesogenic mono-, di- and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers in a polymerizable LC mixture are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Examples of especially useful polymerisable mesogenic compounds (reactive mesogens) are shown in the following lists which should, however, be taken only as illustrative and is in no way intended to restrict, but instead to explain the present invention:

(R1)

(R2)

(R3)

(R4)

(R5)

(R6)

(R7)

(R8)

(R9)

(R10)

(R11)

(R18)

(R19)

In the above formulae, P is a polymerisable group, preferably an acryl, methacryl, vinyl, vinyloxy, propenyl ether, epoxy, oxetane or styryl group, x and y are identical or different integers from 1 to 12, A is 1,4-phenylene that is optionally mono-, di- or trisubstituted by $L^1$, or 1,4-cyclohexylene, u and v are independently of each other 0 or 1, $Z^0$ is —COO—, —OCO—, —CH$_2$CH$_2$—, —CH=CH—, —C≡C— or a single bond, $R^0$ is a polar group or an unpolar group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4. The phenyl rings in the above formulae are optionally substituted by 1, 2, 3 or 4 groups L.

The term 'polar group' in this connection means a group selected from F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono- oligo- or polyfluorinated alkyl or alkoxy group with 1 to 4 C atoms. The term 'unpolar group' means an optionally halogenated alkyl, alkoxy, alkycarbonyl, alkoxycarbonyl, alkylcarbonyloxy or alkoxycarbonyloxy group with 1 or more, preferably 1 to 12 C atoms which is not covered by the above definition of 'polar group'.

Especially preferred are mixtures comprising one or more polymerisable compounds comprising an acetylene or tolane group with high birefringence, like e.g. compounds of formula Ig above. Suitable polymerisable tolanes are described for example in GB 2,351,734.

Suitable photoisomerisable compounds are known in prior art. Examples of photoisomerisable compounds include azobenzenes, benzaldoximes, azomethines, stilbenes, spiropyrans, spirooxadines, fulgides, diarylethenes, cinnamates. Further examples are 2-methyleneindane-1-ones as described for example in EP 1 247 796, and (bis-)benzylidenecycloalkanones as described for example in EP 1 247 797.

Especially preferably the LC material comprises one or more cinnamates, in particular cinnamates reactive mesogens (RMs) as described for example in U.S. Pat. No. 5,770,107 (P0095421) and EP 02008230.1. Very preferably the LC material comprises one or more cinnamate RMs selected of the following formulae wherein P, A and v have the meanings given above, L has one of the meanings of $L^1$ as defined above, Sp is a spacer group, like for example alkylene or alkyleneoxy with 1 to 12 C-atoms, or a single bond, and R is Y or $R^0$ as defined above or denotes P-Sp.

Especially preferred are cinnamate RMs containing a polar terminal group Y as defined above. Very preferred are cinnamate RMs of formula III and IV wherein R is Y.

The photoradiation used to cause photoisomerisation in the LC material depends on the type of photoisomerisable compounds, and can be easily selected by the person skilled in the art. Generally, compounds that show photoisomerisation induced by UV-radiation are preferred. For example, for cinnamate compounds like those of formula III, IV and V, typically UV-radiation with a wavelength in the UV-A range (320-400 nm) or with a wavelength of 365 nm is used.

It was found that polymerisable LC materials containing a high amount of photoisomerisable compounds are especially useful to the purpose of the present invention, as these materials allow to easily control and adjust the retardation of the optical retardation film. For example, an oriented layer of LC mixture containing a high amount of photoisomerisable compounds, which is subjected to radiation inducing photoisomerisation, shows a large decrease in retardation with increasing irradiation time. In such a material the retardation can be altered within a broader range of values and can be controlled more accurately, e.g. by varying the irradiation time, compared to a material showing only a slight change of retardation.

Thus, according to a first preferred embodiment of the present invention, the polymerisable component of the polymerisable LC material comprises at least 12 mol % of photoisomerisable compounds, preferably cinnamate RMs, most preferably selected from formula III, IV and V.

The term 'polymerisable component' refers to the polymerisable mesogenic and non-mesogenic compounds in the total polymerisable mixture, i.e. not including other non-polymerisable components and additives like initiators, surfactants, stabilizers, solvents and the like.

Preferably the polymerisable component of the LC material comprises 12 to 100 mol %, very preferably from 40 to 100 mol %, in particular from 60 to 100 mol %, most preferably from 80 to 100 mol % of photoisomerisable compounds, preferably cinnamate RMs, most preferably selected from formula III, IV and V.

In another preferred embodiment, the polymerisable component of the LC material comprises from 20 to 99 mol %, preferably from 40 to 80 mol %, most preferably from 50 to 70 mol % of photoisomerisable compounds, preferably cinnamate RMs, most preferably selected from formula III, IV and V.

In another preferred embodiment, the polymerisable component of the LC material comprises 100 mol % photoisomerisable RMs, preferably cinnamate RMs, most preferably selected from formula III, IV and V.

The tilt angle θ of LC-molecules (directors) in the polymerised film can be determined from retardation measurements. These measurements show that, if the LC material is exposed to the photoirradiation that is used for photoisomerisation for a longer time, or to a higher radiation intensity, its original planar orientation changes into tilted or splayed orientation. Remarkably, these splayed films do not exhibit reverse tilt defects, which are normally associated with splayed LC films formed on a low pretilt substrate. Therefore, the method according to the present invention provides an elegant way of obtaining a uniform, splayed retardation film.

Thus, according to a second preferred embodiment of the present invention, the orientation of the LC material in the film is controlled by varying the irradiation time and/or intensity of the photoradiation used to cause isomerisation in the LC material.

This second preferred embodiment also relates to a method of preparing a polymerised LC film having splayed structure, and showing a reduced number of reverse tilt defects, or even being free of tilt defects, by varying the orientation in a layer of polymerisable LC material having planar orientation as described in steps a) to e) above.

This embodiment also relates to a splayed film obtained by said method, preferably having a thickness of less than 3 μm, very preferably from 0.5 to 2.5 μm.

The optimum irradiation time and radiation intensity depend on the type of LC material used, in particular on the type and amount of photoisomerisable compounds in the LC material.

As mentioned above, the decrease in retardation of a polymerisable LC material containing for example cinnamate RMs is greater for mixtures with high concentrations of cinnamate RMs. On the other hand, irradiation of the polymerisable LC material with a high dose of UV-light leads to the formation of splayed films.

Thus, another method to control the change of retardation and orientation in the LC layer is by defining the maximum decrease of retardation achieved by photoisomerisation, whilst still maintaining the planar orientation in the LC layer, as a function of the concentration of photoisomerisable compounds.

In a polymerisable LC mixture for use in a method of preparing a film according to the present invention, where an orientation change from planar to splayed is not required, the polymerisable component preferably comprises 40 to 90 mol %, very preferably 50 to 70% of photoisomerisable cinnamate compounds of formula III, IV and/or V.

In a polymerisable LC mixture for use in a method of preparing a film according to the present invention, where an orientation change from planar to splayed is desired, the polymerisable component preferably comprises 100% of photoisomerisable cinnamate compounds of formula III, IV and/or V.

Also, a polymerisable LC mixture for use in a method of preparing a film according to the present invention, where an orientation change from planar to splayed is desired, preferably does not comprise photoisomerisable cinnamate compounds of formula III or IV wherein R is an alkyl group.

By using photomask techniques, it is possible to use the method according to this second preferred embodiment to prepare patterned films comprising regions with different orientation and/or different retardation.

Especially preferred is a film comprising at least one region having planar orientation and at least one region having splayed orientation.

Further preferred is a film comprising at least one region wherein the retardation is zero.

The method described above can also be used to prepare a multilayer comprising multiple polymerised LC films, each having with different orientation of the LC material, preferably by a method comprising steps A), B) and C)as described above.

Especially preferred is a multilayer comprising two or more, very preferably two, three or four polymerised LC films.

For example, a first polymerised planar LC film is produced as described above. This film is used as substrate and subsequently coated with a second layer of the same LC mixture. The second layer is then also aligned into planar orientation. Thus, a stack comprising two planar polymerised LC films can be produced. If the second layer is irradiated e.g. with UV-light of a sufficient dose prior to polymerisation, it shows splayed structure. Thus, a stack comprising a planar and a splayed polymerised LC film can be produced.

If the LC mixture in the first layer is irradiated e.g. with UV-light of a sufficient dose prior to polymerisation, the first layer shows yields a splayed LC film. If a second layer of the same LC mixture is coated onto this splayed film and irradiated prior to polymerization, the second layer forms a homeotropically aligned layer, thus a stack of splayed and homeotropic films can be produced.

Especially preferred is a multilayer comprising at least one layer having planar orientation and at least one layer having splayed orientation.

Further preferred is a multilayer comprising at least one layer having splayed orientation and at least one region having homeotropic orientation.

It is also possible to combine the above methods to prepare a film that has a pattern of regions with different orientation and regions with different retardation.

It is also possible to combine the above methods to prepare a multilayer comprising two or more layers, at least one of which has a pattern of regions with different orientation and/or with different retardation.

In a third preferred embodiment, the film according to the present invention is used as optical retardation film in an LCD not outside the switchable LC cell of the display, but between the substrates, usually glass substrates, forming the switchable LC cell and containing the switchable LC medium (in-cell application).

Compared to conventional displays where optical retarders are usually placed between the LC cell and the polarisers, incell application of an optical retardation film has several advantages. For example, a display where the optical film is attached outside of the glass substrates forming the LC cell usually suffers from parallax problems, which can severely impair viewing angle properties. If the retardation films is prepared inside the LC display cell, these parallax problems can be reduced or even avoided.

An LCD according to this embodiment preferably comprises
1) a liquid crystal (LC) cell comprising the following elements, starting from the edges to the centre of the cell in the sequence listed below
   11) a first and a second substrate plane parallel to each other, at least one of which is transparent to incident light,
   12) an array of nonlinear electric elements on one of said substrates which can be used to individually switch individual pixels of said LC cell, said elements being preferably active elements like transistors, very preferably TFTs,
   13) a colour filter array provided on one of said substrates, preferably on the substrate opposite to that carrying the array of nonlinear elements, said colour filter optionally being covered by a planarisation layer,
   14) a first electrode layer provided on the inside of said first substrate,
   15) optionally a second electrode layer provided on the inside of said second substrate,
   16) optionally first and second alignment layers provided on said first and second electrodes,
   17) an LC medium that is switchable between at least two different states by application of an electric field,
2) a first linear polarizer on one side of the LC cell,
3) optionally a second linear polarizer on the side of the LC cell opposite to that of the first linear polariser, and
4) at least one patterned optical retardation film, characterized in that said patterned optical retardation film 4) is situated between the first and second substrate of the LC cell, preferably between the colour filter and the liquid crystal medium, very preferably between the colour filter and one of said electrode layers, or if a planarisation layer is present, between the planarising layer and one of said electrode layers.

Figure 4:
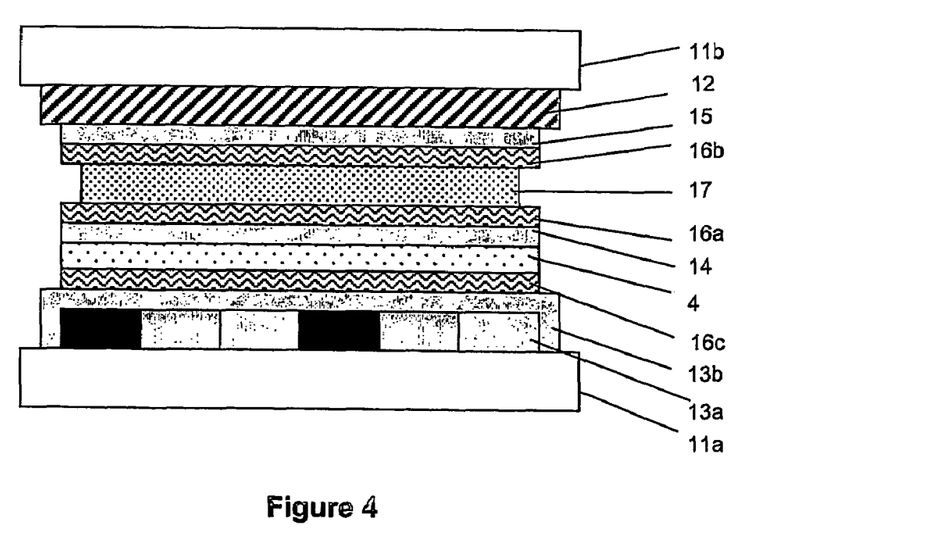
FIG. 4 schematically depicts an active-matrix colour LCD comprising an optical film according to the present invention.

An LCD according to this preferred embodiment is exemplarily depicted in FIG. 4, comprising two substrates (11a, 11b), a TFT array (12), a colour filter array (13a), a planarisation layer (13b), electrode layers (14) and optionally (15), optionally two alignment layers (16a, 16b), an LC medium (17), and an optical retardation film (4) according to the present invention that is positioned between the planarisation layer and LC medium and optionally provided on another alignment layer (16c).

Depending on the display mode, the alignment layer (16a) and/or (16b), and one of the electrode layers (14) and (15) may also be omitted. Preferably, an alignment layer (16c) is present between the optical retardation film (4) and the planarisation layer (13b).

The optical retardation film (4) can also be positioned directly (i.e. without the presence of an intermediate layer) on the colour filter array (13a) without the presence of a planarisation layer (13b), so that the optical retardation film serves as planarisation layer. It is also possible that the optical retardation film (4) is positioned between the colour filter array (13a) and the planarisation layer (13b). Preferably, an alignment layer (16c) is present between the optical retardation film (4) and the colour filter (13a).

Especially preferably, the optical retardation film (4) is prepared directly on top of the colour filter (13a) or the planarisation layer (13b) inside the display cell, i.e. the colour filter or planarisation layer, optionally covered by an alignment layer, serve as substrate for the LC film preparation.

As colour filter (13a) any standard colour filter known in prior art for use in flat panel displays can be used. Such a colour filter typcially has a pattern of different pixels transmitting one of the primary colours red, green and blue (R, G, B). The optical retardation film (4) preferably exhibits a pattern of pixels with three different retardations, each of which is adjusted such that its efficiency of converting linearly polarised light into circularly polarised light is optimised for one of the colours R, G and B, and is preferably positioned on the colour filter such that each R-, G- or B-pixel of the colour filter is covered by a corresponding pixel of the optical retardation film having a retardation optimised for this colour.

The thickness of a film according to the present invention, or in case of multilayers the thickness of a single layer, is preferably from 0.5 to 2.5 microns, very preferably from 0.6 to 2 microns, most preferably from 0.7 to 1.5 microns.

The on-axis retardation (i.e. at 0° viewing angle) of a film or layer according to the present invention is preferably from 60 nm to 400 nm, especially preferably from 100 nm to 350 nm.

For practical applications in LCDs it is especially preferred that the optical retardation film shows a retardation of approximately 0.25 times of the wavelength of incident light, also known in prior art as quarter-wave retardation plate or film (QWF) or $\lambda/4$-plate. Especially preferred retardations for use as QWF are from 90 to 200 nm, preferably from 100 to 175 nm.

Further preferred is a retardation film comprising regions with one or more, preferably one, two or three different values of the retardation, each of said values being adjusted such that its efficiency of converting linearly polarised light into circularly polarised light is optimised for light of one of the primary colours red, green and blue (R, G, B). In particular, said values of retardation are as follows:

For red light of a wavelength of 600 nm the retardation is from 140 to 190 nm, preferably 145 to 180 nm, very preferably 145 to 160 nm, most preferably 150 nm.

For green light of a wavelength of 550 nm the retardation is from 122 to 152 nm, preferably 127 to 147 nm, very preferably 132 to 142 nm, most preferably 137 nm.

For blue light of a wavelength of 450 nm the retardation is from 85 to 120 nm, preferably 90 to 115 nm, very preferably 100 to 115 nm, most preferably 112 nm.

The films according to the present invention can also be used as alignment layers for LC materials. For example, it is possible to use a polymerised LC film according to the invention to align a subsequent layer of a polymerisable LC material coated thereon. In this way, stacks of polymerised LC films can be prepared. As the orientation of the first polymerised LC layer influences the alignment on the subsequent layer, and the alignment in the LC material can be varied by varying radiation intenstiy, time and amount of photoisomerisable compounds, it is possible to prepare stacks with different combinations of planar, homeotropic and splayed films.

To prepare a polymerised LC film, the polymerisable LC mixture is preferably coated onto a substrate, aligned, preferably into planar orientation, and polymerised in situ, for example by exposure to heat or actinic radiation, to fix the orientation of the LC molecules. Alignment and curing are carried out in the LC phase of the mixture. This technique is well-known in the art and described for example in D. J. Broer, et al., Angew. Makromol. Chem. 183, (1990), 45-66.

Alignment of the LC material can be achieved for example by treatment of the substrate onto which the material is coated, by shearing the material during or after coating, by application of a magnetic or electric field to the coated material, or by the addition of surface-active compounds to the LC material. Reviews of alignment techniques are given for example by 1. Sage in "Thermotropic Liquid Crystals", edited by G. W. Gray, John Wiley & Sons, 1987, pages 75-77, and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

In a preferred embodiment the polymerisable LC material comprises an additive that induces or enhances planar alignment of the LC molecules on the substrate. Preferably the additive comprises one or more surfactants. Suitable surfactants are described for example in J. Cognard, Mol. Cryst. Liq. Cryst. 78, Supplement 1, 1-77 (1981). Particularly preferred are non-ionic surfactants, very fluorocarbon surfactants, like for example the commercially available fluorocarbon surfactants Fluorad FC-171® (from 3M Co.), or Zonyl FSN® (from DuPont), and the surfactants described in GB 0227108.8.

The polymerisable LC material is preferably dissolved or dispersed in a solvent, preferably in an organic solvent. The solution or dispersion is then coated onto the substrate, for example by spin-coating or other known techniques, and the solvent is evaporated off before polymerisation.

The polymerisable LC material may additionally comprise a polymeric binder or one or more monomers capable of forming a polymeric binder and/or one or more dispersion auxiliaries. Suitable binders and dispersion auxiliaries are disclosed for example in WO 96/02597. Especially preferred, however, are LC materials not containing a binder or dispersion auxiliary.

Polymerisation can be achieved for example by exposure to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation at a non-absorbing wavelength. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

Polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable materials with acrylate or methacrylate groups, preferably a radical photoinitiator is used, when curing polymerisable materials with vinyl, epoxide and oxetane groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used.

The polymerisable LC material can additionally comprise one or more other suitable components such as, for example, catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

The optical retardation film according to the present invention can be used as retardation or compensation film or as alignment layer in conventional LCDs, in particular those of the DAP (deformation of aligned phases) or VA (vertically aligned) mode, like e.g. ECB (electrically controlled birefringence), CSH (colour super homeotropic), VAN or VAC (vertically aligned nematic or cholesteric) displays, MVA (multidomain vertically aligned) or PVA (patterned vertically aligned) displays, in displays of the bend mode or hybrid type displays, like e.g. OCB (optically compensated bend cell or optically compensated birefringence), R-OCB (reflective OCB), HAN (hybrid aligned nematic) or pi-cell (π-cell) displays, furthermore in displays of the TN (twisted nematic), HTN (highly twisted nematic) or STN (super twisted nematic) mode, in AMD-TN (active matrix driven TN) displays, or in displays of the IPS (in plane switching) mode which are also known as 'super TFT' displays.

Especially preferred are TN, STN, VA and IPS displays, in particular those of the active-matrix type. Further preferred are transflective displays.

The films according to the present invention can also be used in optical or electrooptical devices for other purposes than those described above, for example as alignment layer, optical filter or polarization beam splitter, or in decorative or security applications.

For example, they can be used as birefringent marking, image or pattern in decorative or security applications. With the methods of the present invention it is possible to produce negative images in films which are only visible between crossed-polarisers. A preferred use of these films is as security marking or security thread to authenticate and prevent counterfeiting of documents of value, or for identification of hidden images, informations or patterns. It can thus be applied to consumer products or household objects, car bodies, foils, packing materials, clothes or woven fabric, incorporated into plastic, or applied on documents of value like banknotes, credit cards or ID cards, national ID documents, licenses or any product with money value, like stamps, tickets, shares, cheques etc.

Especially preferred for use as birefringent marking is a patterned film that is provided on or directly prepared on a reflective substrate, for example a metal or metallised film or foil, as described in EP 02019792.7.

By using the method according to the present invention it is also possible to create a film with constant thickness and large lateral dimensions having a graded refractive index, i.e. wherein the refractive index continuously-decreases in a direction parallel to the film plane from one edge to the opposite egde.

Such a film can for example be prepared as follows: A polymerisable LC material as described above and below is flow-filled into a cell formed by two plane-parallel substrates provided with rubbed polyimide alignment layers to induce planar alignment. The LC material is then isomerised as described above through a grey-scale mask, which is created such that no UV passes in one region, gradually moving to a region where all UV passes. This creates a gradual change in refractive index in the film, while the thickness is constant. The LC material film is then polymerised in situ, e.g. by photopolymerisation, and the polymer film removed from the cell. This then provides a film with graduated refractive index suitable for an optical waveguide for light being passed up through the narrow part of the film.

To achieve a film thickness in the range of several millimetres, the polymerisable LC material is preferably coated, aligned and polymerised between two substrates, e.g. in a cell formed by two rigid substrates such as glass or quartz plates. Such a film can be used for example as an optical waveguide.

For example, in WO 01/72037 and WO 02/060187 an optical waveguide is disclosed for use as large area flat panel display or projection display. The waveguide which consists of a flat, wedge-shaped glass or plastic panel having lateral dimensions up to more than 1 metre, and a thickness of for example from 0.5 to 2.5 mm that decreases continuously from one egde of the sheet to the opposite edge. Light, e.g. laserlight, enters the wedge at its small side having the higher thickness and propagates inside the wedge, being reflected at the inner surfaces with an increasing reflection angle, until a critical angle is reached where the light leaves the wedge. The incident angle at which the light enters the wedge controls how far the light travels inside the wedge before leaving it. Alternatively to the wedge shape, WO 02/060187 suggests to use a planar panel with a diffraction grating embossed onto one of the surfaces. However, the production of a large area panel with a wedge-shaped panel or an embossed diffraction grating requires complicated processing of expensive optical quality materials, like e.g. glass or acryl, with high accuracy.

This drawback can be avoided by using a film according to the present invention having constant thickness and a graded refractive index gradient. Due to its refractive index gradient the film operates in an optically similar way as a wedge having a constant refractive index but a thickness gradient, however, processing of the film to achieve a wedge-shape or surface gratings is not necessary.

A multilayer or patterned retardation film according to the present invention can also be used for optical effects like e.g. parallax barriers as described in U.S. Pat. No. 6,437,915.

The examples below shall illustrate the invention without limiting it. The examples below serve to illustrate the invention without limiting it. In these examples, all temperatures are given in degrees Celsius and all percentages are given as percentage by weight unless stated otherwise.

EXAMPLE 1

The polymerisable LC mixture M1 was formulated, wherein the polymerisable component consists exclusively of isomerisable RMs (i.e. the total amount of isomerisable compounds in the polymerisable component is 100 mol %)

| M1: | |
|---|---|
| (1) | 9.0% |
| (2) | 23.0% |
| (3) | 14.4% |
| (4) | 18.0% |
| (5) | 17.0% |
| (6) | 17.0% |

| M1: | |
|---|---|
| Irgacure 651 | 1.0% |
| Fluoran FC171 | 0.6% |

The compounds (1) to (6) are known in prior art. Irgacure 651 is a commercially available photoinitiator (from Ciba AG, Basel, Switzerland). Fluorad FC 171 is a commercially available non-ionic fluorocarbon surfactant (from 3M).

The mixture was dissolved to create a 50 wt % solution in xylene. This solution was filtered (0.2 μm PTFE membrane) and spin coated onto glass/rubbed polyimide slides (low pretilt polyimide JSR ALI 054 from Japan Synthetic Rubber). The films were exposed to 20 mWcm$^{-2}$ 365 nm radiation in air for varying lengths of time. Subsequently, the films were photopolymerised using 20 mWcm$^{-2}$ UV-A radiation, for 60 seconds in an N$_2$-atmosphere. The retardation, for viewing angles from −60° to +60°, of each sample prepared was determined by measuring the transmission of the film between parallel polarisers, with the orientation axis of the film at an angle of 45° to the polariser axis. The optical transmission was measured with an Oriel Spectrograph, for the wavelength range of 420-800 nm, using a tungsten lamp as the, light source (see O. Parri et al., Mol. Cryst. Liq. Cryst., Vol 332, p 273, 1999). The retardation values at normal incidence (0°) are shown in FIG. 1 as a function of irradiation time.

Figure 1:
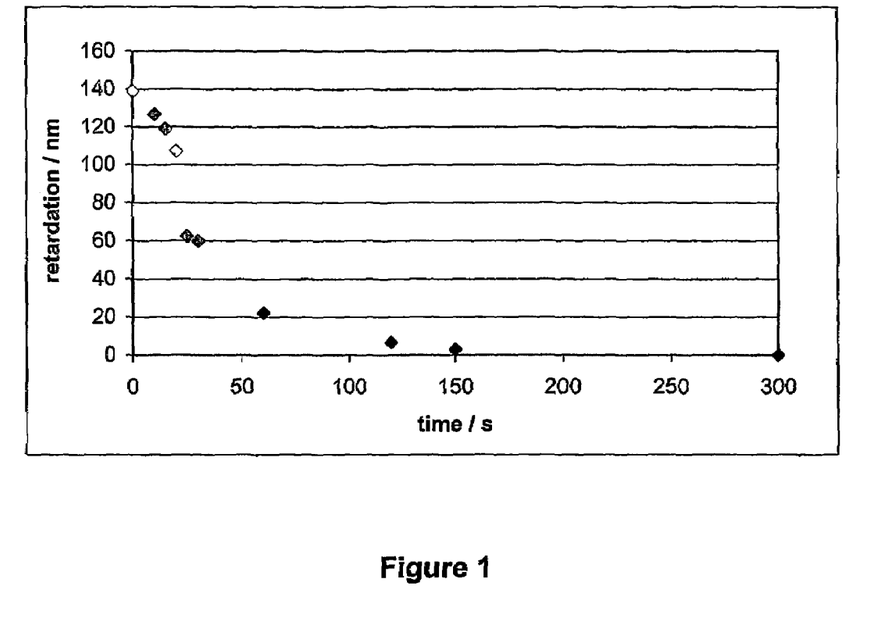
FIG. 1 shows the retardation versus irradiation time of a film prepared by a process according to example 1 of the present invention.

From FIG. 1 it is evident that continued irradiation with 365 nm light leads to films with lower values of retardation. A film which had been exposed for 300 seconds was found to have zero retardation. The thickness of each of the polymerised samples was subsequently measured, using a KLA Tencor-alpha-step 500, and found, within experimental error, to be constant at 1.1±0.1 μm. Since the retardation of the films is decreasing whilst the film thickness remains constant, the birefringence of the film is also decreasing.

The tilt angle θ of LC-molecules (directors) in the films was also determined from retardation measurements. These measurements show that films which were exposed with up to 20 seconds of 365 nm radiation maintained their original planar orientation. Films which had been exposed to 25 seconds or more of 365 nm radiation had a splayed orientation. Remarkably, these splayed films did not exhibit any reverse tilt defects, which are normally associated with such LC-films when they are formed on low pretilt substrates. Hence, this method provides an elegant way of obtaining a uniform, splayed retardation film.

As well as producing a splayed retardation film it is also desirable to produce a planar quarter-wave retardation plate. Such a layer requires a retardation drop of approximately 40 nm, from an initial value of 150 nm, assuming blue pixels centred at 450 nm and red pixels centred at 600 nm. The exact requirement of retardation range depends on the display type used. Films created using the above mixture M1 gave this drop in retardation. At the same time these films also changed from being a planar aligned to being splayed.

EXAMPLE 2

The polymerisable LC mixture M2 was formulated, containing 32 wt. % of non-isomerisable reactive mesogen (7).

| M2: | | |
|---|---|---|
| (3) | 14.4% | |
| (4) | 18.0% | |
| (5) | 17.0% | |
| (6) | 17.0% | |
| (7) | 32.0% | (non-isomerisable) |
| Irgacure 651 | 1.0% | |
| Fluorad FC171 | 0.6% | |

(7)

In M2, the total amount of isomerisable compounds (3) to (6) in the polymerisable component (consisting of compounds (3) to (7)) is 72.8 mol %, and the amount of non-isomerisable compound (7) in the polymerisable component is 27.2 mol %.

Figure 2:
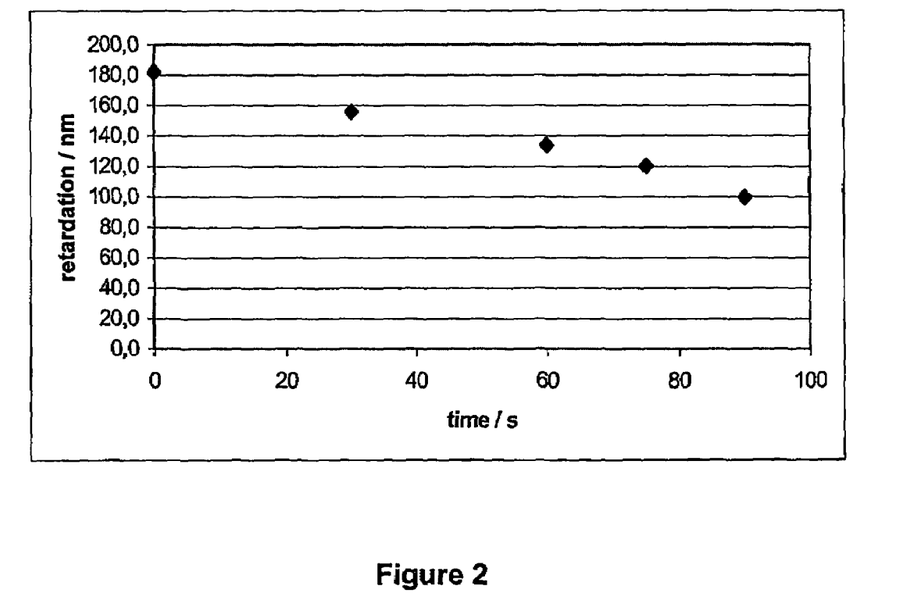
FIG. 2 shows the retardation versus irradiation time of a film prepared by a process according to example 2 of the present invention.

Films of this mixture were prepared and analysed as detailed in Example 1. The retardation at normal incidence is plotted as a function of irradiation time in FIG. 2.

From the retardation data the orientation of the LC-molecules in the films was also determined. It was found that after exposure to 75 seconds of 20 mWcm$^{-2}$ 365 nm light the films produced changed from being planar to being splayed. Therefore, films of this mixture preserve their planar alignment better than those in Example 1. The film thickness was measured and also found to be constant (1.0±0.1 μm) regardless of the alignment of the film. Therefore it is possible to create a planar aligned quarter wave film over the desired range of retardation values.

Further variation of the mixture by incorporating higher amounts of non-isomerisable RMs allows a greater shift in retardation whilst preserving the original planar alignment.

Figure 3:
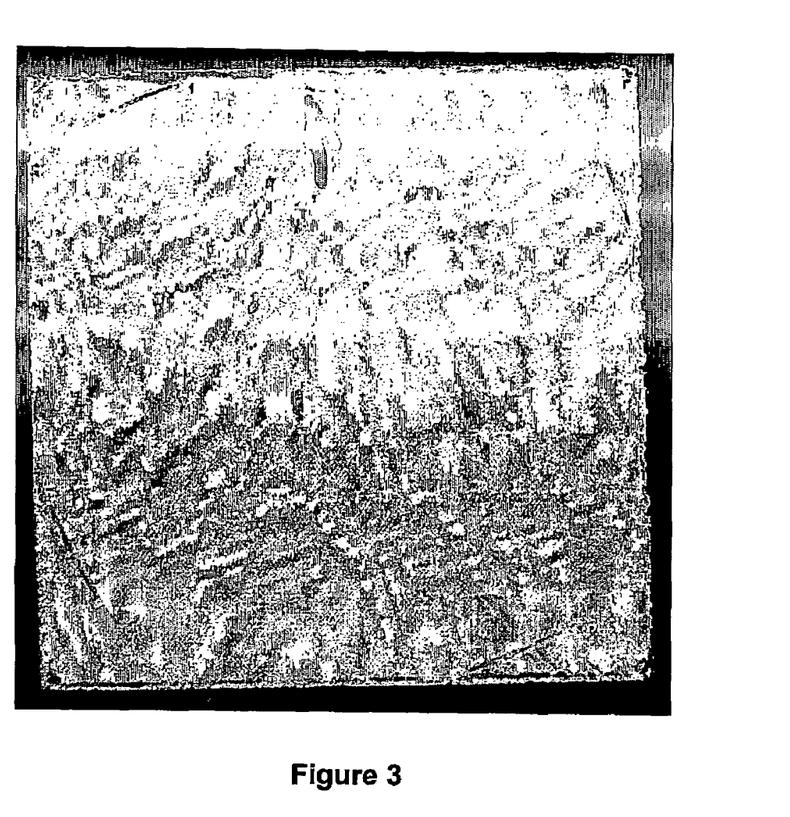
FIG. 3 shows a pixelated optical film according to example 2 of the present invention.

To further demonstrate the concept of producing a patterned retardation layer, a spin coated film was irradiated through a grey-scale (0:50:100% T) mask and photopolymerised as detailed above. A photograph of the resultant pixelated retardation film, held between crossed polarisers, is shown in FIG. 3.

EXAMPLE 3

A) A first polymerised planar LC layer, prepared from mixture M1 as detailed in Example 1, was used as substrate and subsequently coated with a second layer of the same LC mixture M1 that was then polymerised. The second layer was found to be planar aligned. Thus, a stack comprising two planar polymerised LC films was produced.

B) A first and second polymerised LC layer were prepared as described in A), but the second layer was irradiated with a sufficient dose of UV light of 365 nm prior to polymerisation so that it showed splayed alignment. Thus, a stack comprising a planar and a splayed polymerised LC film was produced.

C) A first splayed LC layer was prepared from mixture M1 as described in Example 1 and used as an alignment layer. A second layer of the same LC mixture M1 was coated onto the side of the first splayed film showing maximum tilt angle, i.e. having approximately homeotropic orientation. The mixture in the second layer was irradiated with UV light of 365 nm prior and then polymerised. As a consequence, the LC material second layer was homeotropically aligned throughout the layer. Thus, a stack of a splayed and a homeotropic LC film was produced.

The invention claimed is:

1. A film comprising a polymerised nematic or smectic liquid crystal material, said polymerised liquid crystal material comprising at least one photoisomerisable compound, and wherein said film comprises at least two regions with different retardation of liquid crystal material, and/or at least two regions with different orientation of the liquid crystal material.

2. A film according to claim 1, wherein said film comprises at least two regions with different retardation of the liquid crystal material.

3. A film according to claim 1, wherein said film is obtained by polymerisation or crosslinking of a polymerisable liquid crystal material comprising at least one polymerisable and photoisomerisable compound.

4. A film according to claim 1, wherein the orientation of the liquid crystal material is controlled by varying the irradiation time and/or intensity of the photoradiation used to cause photoisomerisation in the liquid crystal material.

5. A film according to claim 1, wherein the polymerisable liquid crystal material comprises one or more photoisomerisable compounds selected from azobenzenes, benzaldoximes, azomethines, stilbenes, spiropyrans, spirooxadines, fulgides, diarylethenes, cinnamates, 2-methyleneindane-1-ones and bis-benzylidenecycloalkanones.

6. A film according to claim 5, wherein the polymerisable liquid crystal material comprises one or more photoisomerisable compounds selected from polymerisable mesogenic cinnamates.

7. A film according to claim 1, wherein the polymerisable liquid crystal material comprises one or more photoisomerisable compounds selected from the following formulae wherein
- A is 1,4-phenylene or 1,4-cyclohexylene,
- P is a polymerisable group,
- Sp is a spacer group or a single bond,
- R is a polar group or an unpolar alkyl or alkoxy group with up to 15 C atoms,
- L is in each occurrence independently H, F, Cl, CN or an optionally halogenated alkyl, alkoxy, alkylcarbonyl, alkoxycarbonyl or alkoxycarbonyloxy group having in each case 1 to 7 C atoms, and
- v is 0 or 1, and wherein the phenylene rings are optionally mono- di-, tri- or tetrasubstituted by L.

8. A film according to claim 1, wherein said polymerised material is obtained from a polymerisable liquid crystal material having a polymerisable component, and said polymerisable component comprises at least 12 mol % of photoisomerisable compounds.

9. A film according to claim 8, wherein the polymerisable component of the polymerisable liquid crystal material comprises from 40 to 100 mol % of photoisomerisable compounds.

10. A film according to claim 8, wherein the polymerisable component of the polymerisable liquid crystal material comprises 100% of photoisomerisable compounds.

11. A polymerisable liquid crystal material for preparing a film comprising a polymerised nematic or smectic liquid crystal according to claim 1, said polymerisable liquid crystal material having a polymerisable component, and said polymerisable component comprising at least 12 mol % of photoisomerisable compounds.

12. A patterned film comprising polymerised nematic or smectic liquid crystal material, wherein said film comprises at least two regions with different retardation and at least two regions with different orientation of the liquid crystal material.

13. A method of preparing a film according to claim 1, said method comprising:
a) providing a layer of a polymerisable liquid crystal material comprising at least one photoisomerisable compound onto a substrate,
b) aligning said layer of liquid crystal material into planar orientation,
c) exposing the liquid crystal material in said layer, or in selected regions thereof, to photoradiation to cause isomerisation of said isomerisable compound, d) polymerising the liquid crystal material in at least a part of the exposed regions the material, thereby fixing the orientation, and
e) optionally removing the polymerised film from the substrate.

14. A method according to claim 13, wherein the retardation and/or orientation of the liquid crystal material is controlled by varying the amount and/or type of the photoisomerisable compound, and/or by varying the intensity of the photoradiation and/or the exposure time.

15. A method of preparing a multilayer structure comprising at least two layers of polymerised nematic or smectic liquid crystal material having different orientation, comprising:
A) providing a first layer of a polymerisable liquid crystal material comprising at least one photoisomerisable compound onto a substrate,
B) aligning the first layer of liquid crystal material into planar orientation and polymerising the material, thereby fixing the orientation,
C) providing a second layer of liquid crystal material as described in A) and B), wherein the first layer serves as substrate,
wherein the liquid crystal material in at least one of said first and second layers, or in selected regions thereof, before polymerisation, is exposed to photoradiation to cause isomerisation of the isomerisable compound.

16. A method according to claim 13, wherein the liquid crystal material is exposed to radiation that causes photoisomerisation and photopolymerisation, and photoisomerisation is carried out in the presence of oxygen and photopolymerisation is carried out in the absence of oxygen.

17. A multilayer structure obtained by a method according to claim 15.

18. A film according to claim 13, wherein said film comprises at least one region having planar orientation and at least one region having splayed orientation.

19. A multilayer structure according to claim 17, wherein said structure comprises at least one layer having planar orientation and at least one layer having splayed orientation.

20. A multilayer structure according to claim 17, wherein said structure comprises at least one layer having splayed orientation and at least one region having homeotropic orientation.

21. In an active matrix color liquid crystal display containing an optical retardation film, the improvement wherein said film comprises a patterned film having at least two regions having different retardation.

22. In a liquid crystal display containing an optical retardation film, the improvement wherein said film is an optical retardation film according to claim 1.

23. A display according to claim 22, wherein said film is positioned between the substrates of the switchable liquid crystal cell.

24. A liquid crystal display comprising a liquid crystal cell formed by two plane parallel substrates at least one of which is transparent to incident light,
an electrode layer provided on the inside of at least one of said two transparent substrates and optionally superposed with an alignment layer,
a liquid crystal medium located between the two substrates, and said medium is switchable between at least two different states by application of an electric field, and
at least one film according to claim 1 positioned between the two plane parallel substrates forming the liquid crystal cell.

25. A liquid crystal display comprising:
1) a liquid crystal cell comprising the following elements 11)-17), starting from the edges to the center of the cell in the following sequence
11) a first and a second substrate plane parallel to each other, at least one of which is transparent to incident light,
12) an array of nonlinear electric elements on one of said substrates which can be used to individually switch individual pixels of said liquid crystal cell,
13) a color filter array provided on one of said substrates, said color filter optionally being covered by a planarisation layer,
14) a first electrode layer provided on the inside of said first substrate,
15) optionally a second electrode layer provided on the inside of said second substrate,
16) optionally first and second alignment layers provided on said first and second electrodes, and
17) an liquid crystal medium that is switchable between at least two different states by application of an electric field;
2) a first linear polariser on one side of the liquid crystal cell,
3) optionally a second linear polariser on the side of the liquid crystal cell opposite to that of the first linear polariser, and
4) at least one optical retardation film according to claim 1, said optical retardation film 4) being positioned between the color filter and the liquid crystal medium.

26. A liquid crystal display according to claim 25, wherein said color filter has a pattern of different pixels transmitting one of the primary colors red, green and blue (R, G, B), and the optical retardation film exhibits a pattern of pixels with three different retardations, each of which is adjusted such that its efficiency of convening linearly polarised light into circularly polarised light is optimized for one of the colors R, G and B, and the optical retardation film is positioned on the color filter such that each R-, G- or B-pixel of the color filter is covered by a corresponding pixel of the optical retardation film having a retardation optimized for this color.

27. An optical waveguide comprising a film according to claim 1.

28. An optical waveguide according to claim 27, wherein said waveguide has constant thickness and a refractive index gradient wherein the refractive index continuously decreases in a direction parallel to the film plane from one edge of the waveguide to its opposite edge.

29. A film according to claim 1, wherein said film:
(a) has a pattern of a first and a second region, wherein the first and said second region differ in both retardation and orientation;
(b) has a pattern of a first, a second and a third region, wherein said first and second region differ in either retardation or orientation, and said third region differs in at least one of retardation and orientation from at least one of said first and said second regions; or
(c) has a pattern of a first, a second, a third and a fourth region, each of which has a retardation different from each other region, and two of said regions have the same orientation.

30. A film according to claim 1, wherein said polymerised liquid crystal material is obtained by polymerizing a mixture containing at least one polymerisable mesogenic compound selected from the following formulas:

(R1)

(R2)

(R3)

(R4)

(R5)

(R6)

(R7)

(R8)

(R9)

(R10)

(R11)

(R18)

(R19)

wherein
P is a polymerisable group selected from acryl, methacryl, vinyl, vinyloxy, propenyl ether, epoxy, oxetane or styryl groups,
x and y are identical or different integers from 1 to 12,
A is 1,4-phenylene that is optionally mono-, di- or trisubstituted by $L^1$, or 1,4-cyclohexylene,
u and v are independently of each other 0 or 1,
$Z^0$ is —COO—, —OCO—, —CH$_2$CH$_2$—, —CH=CH—, —C≡C— or a single bond,
$R^0$ is a polar group selected from F, Cl, CN, NO$_2$, OH, OCH$_3$, OCN, SCN, an optionally fluorinated alkylcarbonyl having up to 4 C atoms, alkoxycarbonyl having up to 4 C atoms, alkylcarbonyloxy having up to 4 C atoms, alkoxycarbonyloxy group having up to 4 C atoms, or a mono- oligo- or polyfluorinated alkyl or alkoxy group with 1 to 4 C atoms, or is an unpolar group selected from optionally halogenated alkyl having up to 12 C atoms, alkoxy having up to 12 C atoms, alkycarbonyl having up to 12 C atoms, alkoxycarbonyl having up to 12 C atoms, alkylcarbonyloxy having up to 12 C atoms, or alkoxycarbonyloxy group,
L, $L^1$ and $L^2$ are each independently H, F, Cl, CN or an optionally halogenated alkyl, alkoxy, alkylcarbonyl, alkylcarbonyloxy, alkoxycarbonyl or alkoxycarbonyloxy group, in each case having 1 to 7 C atoms, and
r is 0, 1, 2, 3 or 4, and
the phenyl rings in the above formulae are optionally substituted by 1, 2, 3 or 4 groups L.

31. A film according to claim 7, wherein said polymerised material is obtained from a polymerisable liquid crystal material having a polymerisable component, and said polymerisable component comprises at least 12 mol % of photoisomerisable compounds selected from formulas III, IV and V.

32. A film according to claim 31, wherein said polymerisable component comprises 80 to 100 mol % of photoisomerisable compounds selected from formulas III, IV and V.

33. A film according to claim 31, wherein said polymerisable component comprises 50 to 70 mol % of photoisomerisable compounds selected from formulas III, IV and V.

34. A film according to claim 1, wherein said film has a thickness of 0.6 to 2 microns.

35. A film according to claim 1, wherein said film has a thickness of 0.7 to 1.5 microns.

36. A film according to claim 1, wherein said film has an on-axis retardation, at 0° viewing angle, of from 60 nm to 400 nm.

37. A film according to claim 1, wherein said film has an on-axis retardation, at 0° viewing angle, of from 100 nm to 350 nm.

38. A film according to claim 8, wherein said polymerised material is obtained from a polymerisable nematic or smectic liquid crystal material and said polymerisable liquid crystal material comprises at least one di- or multireactive achiral, polymerisable mesogenic or liquid crystal compound and optionally one or more than one monoreactive achiral polymerisable mesogenic or liquid crystal compound.

* * * * *

UNITED STATES PATENT AND TRADEMARK OFFICE
CERTIFICATE OF CORRECTION

PATENT NO.        : 7,435,357 B2
APPLICATION NO.   : 10/552710
DATED             : October 14, 2008
INVENTOR(S)       : Richard Harding It is certified that error appears in the above-identified patent and that said Letters Patent is hereby corrected as shown below:

Column 22, line 31, reads "polymeris able" should read -- polymerisable --
Column 24, line 21, reads "an liquid" should read -- a liquid --
Column 24, line 37, reads "convening" should read -- converting --
Column 25, in formula (R11), delete "$Z^0$"
Column 25, line 50, reads "$L^1$, or" should read -- $L^1$, or --
Column 25, line 59, reads "mono- oligo- or" should read -- mono-, oligo- or --
Column 25, line 62, reads "alkycarbonyl" should read -- alkylcarbonyl --

Signed and Sealed this

Twenty-seventh Day of October, 2009

David J. Kappos
*Director of the United States Patent and Trademark Office*